UNITED STATES PATENT OFFICE.

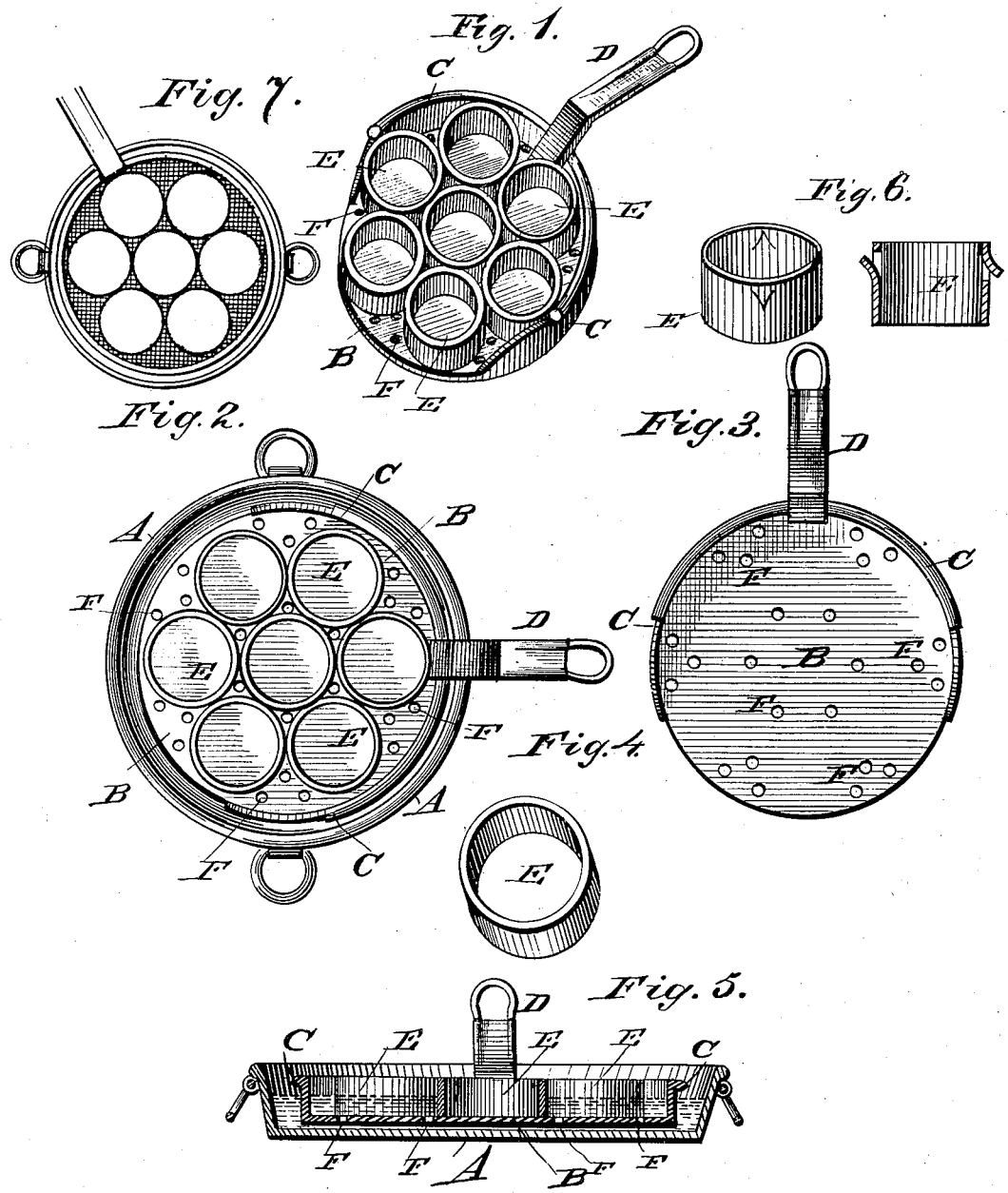

HANNAH JANE RUTTER, OF OAKLAND CITY, INDIANA.

COOKING UTENSIL.

SPECIFICATION forming part of Letters Patent No. 323,887, dated August 4, 1885.

Application filed April 16, 1885. (No model.)

*To all whom it may concern:*

Be it known that I, HANNAH J. RUTTER, a citizen of the United States, and a resident of Oakland City, in the county of Gibson and State of Indiana, have invented certain new and useful Improvements in Culinary Utensils; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved egg and pie lifter. Fig. 2 is a top or plan view of the same, showing it placed in position upon a pan or skillet. Fig. 3 is a top view of the device with the rings or annular chambers removed. Fig. 4 is a detail view of one of the said rings or annular chambers. Fig. 5 is a sectional view of the device, showing it in its proper position in a pan or cooking-vessel. Fig. 6 shows a modification of the rings, and Fig. 7 is a modification of the bottom of the lifter.

Similar letters of reference indicate corresponding parts in all the figures.

My invention relates to an improved culinary utensil adapted for cooking eggs, pies, &c., and lifting the same out of the pan or vessel in which the cooking is done; and it consists in the construction and combination of parts of the improved utensil, which will be hereinafter more fully described and claimed.

In the accompanying drawings, A denotes a pan or vessel of ordinary construction, and to which, in itself, I make no claim.

My improved utensil consists of a disk, B, of any suitable sheet metal, and of such a size and shape that it will fit into the pan or vessel A. The disk B has a raised rim or flange, C, surrounding it in part, and provided with a handle, D; but this rim or flange C is cut away at the front part of the disk, so as to leave the same flat and smooth, in such a manner that it may readily be inserted under the pies or eggs which have been placed in the bottom of the pan, when they have been cooked and it is desired to remove the same.

Placed upon the disk B are a number of rings, E, also made of metal, and of such a size and shape that they will fit against one another and fill the bottom of the pan, as shown on the drawings.

The disk B is provided with a number of perforations, F, so arranged that these perforations will come between the several rings E, and not in the spaces encircled by said rings. If desired, the rings E may be so constructed that they can be hooked or locked together, as shown in Fig. 6, when they are placed upon disk B, in such a manner that they may be easily separated for cleaning and for other purposes; or they may be constructed entirely independent of one another, care being taken that they are of such a size and shape as to fill the disk B when placed together.

If it is desired to use this utensil or implement as an ordinary pie-lifter or egg-lifter, then the rings are removed, and the disk, with its handle D, is used in the same manner as an ordinary flat lifter; but if it is desired to use it for the cooking of eggs, the rings are placed in position, as shown in the drawings, and the eggs, after being broken, are poured into the several compartments formed by the rings, one in each chamber or compartment. The disk is then immersed in boiling water, which is placed in the pan or receptacle A, as shown in Fig. 5, when the water, entering the apertures F, will rise over the disk B and surround the compartments formed by the rings, without entering the said compartments, inasmuch as the apertures F in disk B are, as we have seen, so arranged as to be in the spaces between the rings. After the eggs have been cooked the disk is withdrawn from the water and the rings removed, when the eggs may readily be emptied or discharged upon a dish, plate, or other receptacle.

If desired, the disk B may be made of wire-cloth suitably fastened in a frame, instead of perforated sheet metal, and in that case the spaces which are occupied by the rings are covered upon the disk by circular plates of sheet metal, as shown in Fig. 7, soldered upon the wire mesh in such a manner as to register with the rings when these are placed in their proper position upon the disk.

Having thus described my invention, I claim and desire to secure by Letters Patent of the United States—

The improved culinary utensil herein shown and described, the same consisting of the disk B, having a suitable handle, in combination with the removable rings or annular chambers E, said disk being provided with apertures F in the open spaces not inclosed by the rings when the same are placed in their proper position upon the disk, substantially as and for the purpose set forth.

In testimony that I claim the foregoing as my own I have hereunto affixed my signature in presence of two witnesses.

HANNAH JANE RUTTER.

Witnesses:
 CLOUD L. RUTTER,
 JAMES M. COCKRUM.